United States Patent [19]

Forgione et al.

[11] 3,791,927

[45] Feb. 12, 1974

[54] ENTRAPPED CARRIER BOUND ENZYMES

[75] Inventors: Peter Salvatore Forgione, Stamford, Conn.; Rocco Alberto Polistina, Port Chester, N.Y.; Edward Emil Schmitt, Norwalk, Conn.

[73] Assignee: American Cyanamid Company, Stamford, Conn.

[22] Filed: July 14, 1971

[21] Appl. No.: 162,699

[52] U.S. Cl.............. 195/63, 195/68, 195/DIG. 11
[51] Int. Cl.............................................. C07g 7/02
[58] Field of Search.... 195/63, 68, DIG. 11; 424/21

[56] References Cited
UNITED STATES PATENTS

| | | | |
|---|---|---|---|
| 3,282,702 | 11/1966 | Schreiner | 195/63 X |
| 3,574,062 | 4/1971 | Sato | 195/68 |
| 3,577,512 | 5/1971 | Shepherd et al. | 424/21 |
| 3,730,841 | 5/1973 | Forgione et al. | 195/63 |

OTHER PUBLICATIONS

Bauman et al., "Preparation of Immobilized Cholinesterase for Use in Analytical Chemistry", Analytical Chemistry, Vol. 37, No. 11, 1965 (pp. 1,378–1381) QD71142.

Silman et al., "Water–Insoluble Derivatives of Enzymes, Antigens, and Antibodies", Annual Review of Biochemistry, Vol. 35, part II 1966 (pp. 886 & 887) QP501A7.

Tsumura et al., "Continuous Isomerization of Glucose by a Column of Glucose Isomerase". Journal of Food Science and Technology, Vol. 14, No. 12, 1967 (pp. 539–540) TX341F8.

*Primary Examiner*—David M. Naff
*Attorney, Agent, or Firm*—Frank M. Van Riet

[57] ABSTRACT

The catalytic activity of carrier bound enzymes is maintained and the channelling and compacting of the bound enzyme is substantially reduced by entrapping the carrier bound enzyme in a self-supporting reliculated cellular material.

10 Claims, No Drawings

ENTRAPPED CARRIER BOUND ENZYMES

BACKGROUND OF THE INVENTION

The binding of enzymes to suitable carriers in order to insolubilize said enzymes and thereby render them useful for the conversion of enzymatically convertible substrates has been of interest in recent years. Specifically, Silman et al. al., *Derivatives of Enzymes, Antigens and Antibodies*, Annual Review of Biochemistry, Vol. 35, Part II, P.D. Boyer, Editor; Annual Review Inc., Palo Alto, Calif.; pages 873–908; 1966, discuss many methods for binding enzymes to carriers, including adsorption, inclusion inside the lattice of the carrier, covalent binding and covalent cross-linking. In abandoned application Ser. No. 8,089, filed Feb. 2, 1970 by one of the instant inventors, and hereby incorporated herein by reference, there is disclosed a unique class of polymer bound enzymes and a method for their production. Said class of polymers and many of those commercially available in commerce, although of high activity, tend to compact and channel when utilized as such in processes wherein the bound enzyme is used to convert substrates to their conversion products, especially when the bound enzyme is contained in a contact column.

SUMMARY

We have now found that the catalytic activity of enzymes bound to carriers can be maintained and the channelling and compacting of the bound enzyme can be prevented or substantially reduced by entrapping the bound enzyme in a reticulated cellular material. By "carrier bound enzyme" as used herein, is meant the product produced by binding an enzyme to a carrier by any of the four mechanisms mentioned above and described by Silman et al in said article.

DESCRIPTION OF THE INVENTION INCLUDING PREFERRED EMBODIMENTS

The compositions which are entrapped in the cells of reticulated cellular materials according to our invention comprise a water-insoluble carrier having a catalytically active enzyme bound thereto. Any carrier having these properties may be utilized herein and the enzyme may be bound thereto in any known manner.

Polymers containing reactive carboxylic acid and/or anhydride groups are among carriers useful herein and include such materials as aminoethylated cellulose, diazobenzyl cellulose, diazotized p-aminobenzyl cellulose, amino-s-triazine cellulose, acid chlorides of carboxylic or sulfonic acid ion-exchange resins, carboxymethyl cellulose azide, bromoacetyl cellulose, methacrylic acid-methacrylic acid-3-fluoro-4,6-dinitroanilide copolymers, the diazotized-m-aminobenzyloxymethyl ether of cellulose, diazotized poly-p-aminostyrene, the diazotized copolymer of p-aminophenylalanine and leucine, phosgenized poly-p-aminostyrene, ethylene-maleic anhydride copolymers, polyisothiocyanate derivatives of poly-p-aminostyrene, polystyrylmercuric acetate, acrylamide-methylene-bis acrylamide copolymer gels, polyacrylamide, poly-4-hydroxy-3-nitrostyrene and the like. Examples of non-polymeric carriers which may be used include crushed porous glass, asbestos, charcoal and the like.

Polymers which are preferred for use herein as carriers include those carbonyl polymers, produced according to any known procedure, from such aldehyde monomers as acrolein; $\alpha$-alkyl acroleins, e.g. methacrolein, $\alpha$-propylacrylein; croton-aldehyde; 2-methyl-2-butenal; 2,3-dimethyl-2-butenal; 2-ethyl-2-hexenal; 2-decenal; 2-dodecenal; 2-methyl-2-pentenal; 2-tetradecenal and the like, alone or in admixture with up to 95 percent, by weight, based on the total weight of the copolymer, of each other and/or such other copolymerizable monomers known to react therewith such as unsaturated alcohol esters, e.g., the allyl, crotyl, vinyl, butenyl etc. esters of saturated and unsaturated aliphatic and aromatic monobasic and polybasic acids such as acetic, propionic, butyric, valeric, adipic, maleic, fumaric, benzoic, phthalic, terephthalic, etc. acids; vinyl cyclic compounds (including monovinyl aromatic hydrocarbons) e.g. styrenes, o-, m- and p-chlorostyrenes, -bromostyrenes, -fluorostyrenes, -methylstyrenes, ethylstyrenes, various polysubstituted styrenes, e.g. di-, tri-, and tetra-chlorostyrenes, -bromostyrenes, etc.; vinyl naphthalene, vinyl chloride, divinyl benzene, allyl benezene, vinyl pyridine, diallyl benzene, various $\alpha$-substituted and $\alpha$-substituted, ring-substituted styrenes, e.g. $\alpha$-methyl styrene, $\alpha$-methyl-p-methyl sytyrene, etc.; unsaturated ethers, e.g. ethylvinylether, etc.; unsaturated amides e.g. acrylamide, methacrylamide etc.; N-substituted acrylamides e.g. N-methylolacrylamide, N-allyl acrylamide, N-methyl acrylamide, etc.; acrylates such as the methyl, ethyl, propyl, butyl, etc. acrylates and methacrylates; nitriles such as acrylonitrile and other comonomers shown, for example, in U.S. Pat. No. 2,657,192, mentioned hereinabove.

Examples of other preferred carbonyl polymers which may be utilized include those produced, according to any known procedure and in amounts similar to those indicated above in regard to the aldehyde polymers, from such ketone monomers as methyl vinyl ketone, methyl allyl ketone, ethyl vinyl ketone, methyl isopropenyl ketone, ethyl allyl ketone, etc. phenyl vinyl ketone, p-tolylvinyl ketone. Also, we may use such polymers as poly(vinylpyridinium ketones) and haloketones; copolymers of the above-mentioned aldehyde monomers and ketone monomers with or without the above-disclosed copolymerizable comonomers; polyacetal and the like. The molecular weights of the polymers used is not critical and those as low as 1,000 can be used.

Similarly, such polymers as the copolymers of ethylene and carbon monoxide and various glyoxal adducts, all well known in the art, can be utilized herein.

These carriers are prepared depending, of course, upon the specific starting material being used, by rendering the material susceptible to reaction with the enzyme. In the case of most carbonyl polymers, for example, the polymer is first made water-soluble by reaction with a suitable solubilizing agent such as a bisulfite, specifically an alkali metal or alkaline earth metal bisulfite such as sodium, potassium, calcium etc. bisulfite. The reaction is conducted at a temperature ranging from about 25°C. to about 90°C., at atmospheric pressure, although superatmospheric or subatmospheric pressure can be utilized, if desired, the process being more specifically disclosed in U.S. Pat. No. 2,657,192, hereby incorporated herein by reference. After the bisulfite treatment, the carbonyl polymer is then made hydrophilic, such as by crosslinking. By the term "hydrophilic," as used herein, is meant that the carrier is made wettable or swellable in water but is not substantially soluble therein. The materials can contain hydrophobic members or portions provided that they also have hydrophilic portions which function as such when in contact with water. Any cross-linking agent or water-insolubilizing agent can be used for this purpose such as bis-diazobenzidine, bis-diazohexane, N,N'-(1,2-phenylene-bis-maleimide), phenol-2,4-disulfonyl chloride, m-xylylene diisocyanate, epichlorohydrin, p-nitrophenyl chloroacetate, tris[1-(2-methyl)aziridinyl]phosphine oxide, diamines such as hexamethylene diamine and the like. For example, the general procedure taught in U.S. Pat. No. 3,459,710, also hereby incorporated herein by reference, can be followed. In this method, the bisulfite-polymer adduct or reaction product is contacted with a diamine such as ethylene diamine, tetramethylene diamine, 1,6-hexane diamine, etc. at a temperature of about 0°–150°C. and in the presence of a solvent. If desired, the cross-linking step may be accomplished first and the bisulfite reaction second, the only criteria being that the resultant product is in such a state so as to allow reaction thereof with the enzyme. Insolubilizing the carrier can also be accomplished in a multiplicity of other ways such as by reaction with a polyunsaturated cross-linking agent such as divinyl benzene etc. or any other polyfunctional compound which will cause the formation of a network of polymeric structures via reaction with the carrier through available cross-linking sites. Grafting of the polymer carriers can also be accomplished to render them hydrophilic. Additionally, the insolubilizing can be effected by reacting the carrier material with such agents as 4-aminophenyl sulfide hydrochloride salt etc.

The enzyme is then reacted with the hydrophilic carrier at a temperature below that at which it, the enzyme, is deactivated. The temperatures at which specific enzymes are deactivated are well known to those skilled in the art and therefore need not be enumerated herein. Suffice it to say that generally temperatures below about 75°C., preferably from about 5°C. to about 65°C., should be used. The reaction is preferably carried out in the presence of buffers to control the pH of the reaction mixture at a desired level and with agitation, the particular pH being governed by the particular enzyme being bound, according to known techniques.

In regard to other carriers, especially the polymeric carriers, the same procedure specified above in regard to the carbonyl polymers may be utilized if the carriers per se are not sufficiently hydrophilic to enable them to be bound to the enzyme. That is to say, some materials are not per se watersoluble and since most enzymes are denatured by organic solvents and therefore any reaction therewith must be carried out in an aqueous medium, the carriers must be rendered hydrophilic before contact with the enzyme. Reactions of this general type are shown in U.S. Pat. No. 3,271,334, also hereby incorporated herein by reference.

When the carrier polymer is per se water-soluble, the bisulfite reaction need not be conducted and the enzyme can be contacted with the carrier immediately after rendering it insoluble, such as by cross-linking as discussed above. Watersolubilizing and cross-linking need not be accomplished, of course, if the polymeric carrier is per se hydrophilic. The basic requirement is that the final polymer bound enzyme material must be hydrophilic in order that it may be utilized in the enzymatic conversion of substrates to their conversion products.

In a specific embodiment of the preparation of carrier bound enzyme products, polyacrolein, a water-insoluble polymer which contains some groups with which most enzymes are reactive, must be first contacted with a busilfite such as sodium bisulfite in order to render it water-soluble. In such a condition, however, the polymer cannot be reacted with an enzyme because recovery of any product thereof is relatively impossible. Cross-linking of the bisulfite-polymer product, however, renders it gel-like in consistency and effectively hydrophilic so as to allow reaction with the enzyme. As a result, the bisulfite-polyacrolein product is preferably cross-linked with a diamine such as hexamethylene diamine. The result of these two reactions is believed to be that the bisulfite breaks some of the heterocyclic rings of the polyacrolein creating more enzyme-reactive aldehyde groups thereon, in addition to a series of bisulfite groups. The diamine reacts with some of these aldehyde groups with the formation of —CH=N-linkages between two polymer molecules, thereby cross-linking the polyacrolein. Reaction of the enzyme, e.g. invertase, forms an adduct or covalent bond between the enzyme and the other available aldehyde groups, and also may result in reaction through the bisulfite groups. The resultant adduct is then comprised of a series of cross-linked groups, free aldehyde groups, heterocyclic bisulfite reaction groups and bound enzyme groups.

Exemplary of the enzymes which may be utilized to produce the materials entrapped herein include proteolytic enzymes, hydrolases, amylases, dehydrogenases, kinases, oxidases, deaminases, amidases, antigens, antibodies etc. including lactic dehydrogenase, creatine, phosphokinase, trypsin, papain, alk. phosphatase, amyloglucosidase, dextranase, glucose oxidase, glucose isomerase, amidase, penicillin amidase, chymotrypsin, $\beta$-galactosidase, pyruvate kinase, ficin, pepsin, carboxypeptidase, streptokinase, plasminogen, urease, invertase, alcohol dehydrogenase, diastase, $\beta$-glycosidase, maltase, aldolase, lactase, amygdalase, lipase, steapsin, erepsin, zymase, catalase, melibiase, pectolase, protease, tyrosinase, L-asparaginase, glucose isomerase, cytase, adenase, guanidase, carboxylase, inulase, vinegar oxidase, aldehydase, rhamnase, myrosinase, phytase, tannase, carbamase, nuclease, guanase, adenase, thrombase, chymase, cozymase and the like.

As mentioned briefly above, many carrier bound enzymes become compacted or channelled when in use and in such a condition cannot effectively function in the normal (natural) manner so as to convert substrates to their usual conversion products. We have found that by entrapping the carrier bound enzyme in a self-supporting reticulated cellular material the channelling is materially reduced and the necessity for repacking or agitation of columns containing the bound enzyme during converting processes is obviated.

The bound enzyme may be entrapped in the reticulated cellular material by any convenient procedure. For example, the bound enzyme may be converted into particulate form and compressed, forced or otherwise compacted into the cells of the foam. Any or all surfaces of the foam may be so treated provided that no more than about 95 percent of the outer cells are filled with bound enzyme, the remaining 5 percent remaining open so as to allow substrate solution to flow therethrough. The entrapped carrier bound enzyme can thereafter be packed into a suitable reaction column or utilized as such. The foam containing the entrapped material, however, should preferably be treated so as to prevent the bound enzyme from being leached out or otherwise removed from the cells of the foam during use. The treatment can comprise (1) squeezing or otherwise distorting the foam to close the cells such as by rolling the foam into rolls or (2) coating the bound enzyme portion of the foam with a porous or imperforate coating or covering leaving at least one edge free in order to allow the substrate solution to flow therethrough and contact the entrapped bound enzyme. Thus, for example, polymer bound invertase can be entrapped in a reticulated cellular polyurethane resin, rolled to a suitable size, alone or in conjunction with a covering layer, packed in a contact column and then be utilized to continuously convert sucrose to invert sugar.

By "catalytically active" or "catalytic activity," as utilized herein, is meant the ability or capability of the bound enzyme to convert a particular substrate to its usual conversion product. That is to say, the enzyme still retains its ability to produce a particular natural product from a particular substrate.

The reticulated foams or cellular materials useful herein are well known to those skilled in the art, examples of which, and a method for their production, are disclosed in U.S. Pat. Nos. 3,171,820, 3,175,025, 3,175,030, and 3,297,803 which patents are hereby incorporated herein by reference. Examples of useful cellular materials include any known organic expanded material such as polyurethane resins (polyester or polyether resin based) synthetic rubber cellular materials, natural rubber cellular materials, vinyl resins such as polyvinyl chloride, polystyrene polyethylene etc. cellulose acetate and the like.

Examples of suitable materials which may be used to coat or back the packed cellular materials in order to maintain the integrity of the packed foam include the alginates such as sodium alginate etc., the celluloses such as ethyl cellulose, carboxymethyl cellulose, ethyl, β-hydroxyethyl cellulose, nitrocellulose (collodian) etc., vinyl polymers such as vinyl pyrrolidone-vinyl acetate polymers, polyamides, e.g. adipic acid-hexamethylenediamine reaction products (nylons), acrylamide-methylenebisacrylamide polymers, second layers of the same or different reticulated foams mentioned above, paper, rubber, leather, cloth, and the like.

Incorporation of various preservatives such as antimicrobials, antioxidants, antibiotics etc., into the bound enzymes for the prevention of bacteria formation, fungal growth etc., as is known in the art, may also be effected in concentrations of less than about 1.0 percent by weight, based on the total weight of the bound enzyme. Examples of suitable additives include benzoic acid and its sodium and potassium salts; alkyl esters of p-hydroxybenzoic acid; propionates such as sodium propionate; sodium bisulfite; sodium metabisulfites; sodium diacetate; o-phenylphenol; butylated hydroxyanisole; lecithin; citrates such as monoglyceride citrate, stearyl citrate etc.; oxytetracycline chlorotetracycline; benzyl alcohol; calcium sorbate; sorbic acid, mixtures thereof and the like.

The following examples are set forth for purposes of illustration only and are not to be construed as limitations on the present invention except as set forth in the appended claims. All parts and percentages are be weight unless otherwise specified.

EXAMPLE 1

(Comparative)

0.88 Part of 1,6-hexane diamine, containing 3 parts of water, is slowly added, with stirring, to 44 parts of a 10 percent solution of polyacrolein-sodium bisulfite adduct (m.w. 80,000). The mixture is then heated to 85°C, for 20 minutes and the yellow hydrophilic product which forms is then washed until neutral with distilled water and filtered.

The wet hydrophilic adduct thus obtained is suspended in 50 parts of water and reacted with 0.104 part of invertase (twice recrylstallized) which has been first dissolved in 4 parts of water. The enzyme reaction mixture (pH 6.5) is gently stirred for 18 hours at 10°C, and the resulting hydrophilic convalently bound enzyme polymer adduct is then washed free of unreacted enzyme. Assay of the hydrophilic enzyme-polymer adduct shows high activity with sucrose solution, in the form of the filtered wet cake. This cake is packed in a reaction column and a sucrose solution is continuously charged to the column. After 72 hours of continual operation, the bound enzyme is channelled to such an extent that conversion of the sucrose to invert sugar drops from 92 percent to 60 percent.

EXAMPLE 2

13.7 Parts of the filtered wet cake of bound invertase (13,650 units of activity) produced as in Example 1 are manually worked into a 3"×6"×1/2" sheet of a commercially available reticulated polyurethane foam having 30 pores per linear inch. The enzyme laden sheet then is backed with an one-eighth inch thick sheet of similar dimensions but having 900 pores per linear inch in order to prevent leaking of the enzyme adduct, rolled and forced into a glass contact tube. The packed column thus prepared is then continuously charged with a 60 percent sucrose solution as in Example 1. After 740 hours the conversion of sucrose to invert sugar drops from 75 percent to only 72 percent at a flow rate of 1.1 ml./min.

EXAMPLE 3

Following the procedures of Examples 1 and 2, polyacrolein bound glucose oxidase is prepared and entrapped. After a similar length of contact time in a packed column, the entrapped adduct retains 80 percent of its activity. A similar column of non-entrapped adduct shows channelling and unsatisfactory conversion in 48 hours.

EXAMPLE 4

Again following the procedures of Examples 1 and 2 but replacing the sucrose with 10.0 parts of a 40 percent glucose solution and the invertase with glucose isomerase, assay of the entrapped adduct shows 85 percent retention of its activity after a similar length of contact time. When a column of non-entrapped adduct of similar ingredients is utilized, channelling and decreased conversion result in 3 days.

EXAMPLE 5

10 Parts of the wet filtered cake of a bound polyacrolein-glucoamylase adduct, produced as in Example 1, is similarly entrapped following the procedure of Example 2, and continuously charged with a 30 percent starch solution at 55°C., pH 4.5. After 640 hours, the conversion of starch to glucose drops from 94 to 80 percent. When a column of non-entrapped adduct of similar ingredients is utilized, channelling results in 65 hours with drastically reduced conversion.

EXAMPLE 6

5 Parts of a copolymer of acrolein-styrene (93.8:6.2 weight ratio, respectively) are suspended in 40 parts of water containing 4.3 parts of sodium metabisulfite at pH 5.7. The mixture is stirred over nitrogen at 65°C. for 5 hours, resulting in a completely water-soluble product. To this bisulfite addition product is slowly added, with stirring, 2 parts of 1,6-hexane diamine dissolved in 10 parts of water. The reaction mixture is stirred at 70°C. for one hour. The resultant cross-linked, hydrophilic copolymer is filtered, washed to neutral pH and reacted with 5 ml. of technical grade (k=.6) invertase at 18°C for 15 hours. After entrappment in a foam produced as set forth in Example III of U.S. Pat. No. 3,175,025 and introduction into a column, the bed functions effectively in the conversion to invert sugar for 28 days without repacking or substantial agitation.

EXAMPLE 7

The procedure of Example 6 is again followed except that 10 parts of copolymer of acrolein-acrylonitrile (93.1:6.9 weight ratio, respectively) are used as the polymeric material. The bound enzyme product is recovered and entrapped as in Example 2. A column of the product functions 580 hours without repacking.

EXAMPLE 8

The procedure of Example 6 is again followed except that the polymer is produced from 10 parts of a copolymer of acrolein-acrylic acid (85:15 weight ratio, respectively). Similar results are recorded.

EXAMPLE 9

Substitution of polymethacrolein for the polymer of Example 2 results in an entrapped bound enzyme product, the effectiveness of which is maintained for 820 hours in a column.

EXAMPLE 10

The procedure of Example 3 is again followed except that a methacrolein-styrene (50:50) copolymer (U.S. Pat. No. 2,945,006) is substituted for the polymer used therein. Excellent results are achieved.

EXAMPLE 11

10 Parts of poly(methylvinyl ketone) are treated with 80 parts of water containing 8 parts of sodium bisulfite at pH 5.8 at 65°C. for 18 hours over a nitrogen atmosphere. The resulting bisulfite adduct is then treated with 1.6 parts of ethylene diamine dissolved in 16 parts of water, with stirring, for 25 minutes at 65°C. The hydrophilic polymer is then washed to neutral pH and filtered. The wet cake is suspended in 55 parts of water and reacted with 4 ml. of technical grade invertase (k=.6) at 18°C. for 16 hours. The resulting covalently bound enzyme polymer adduct is washed free of unbound invertase with distilled water and filtered (18.2 g. wet). The adduct is separated in two portions. One portion is entrapped as in Example 2 in a foam produced as set forth in Example 2 of U.S. Pat. No. 3,171,820 and both portions are packed in columns and contacted with 10 percent aqueous sucrose solution for 280 hours. The entrapped adduct affords 80 percent conversion to invert sugar while the non-entrapped adduct yields less than 5 percent conversion at the same flow rate.

Following the procedures of Example 2 or Example 11 except that various copolymers or other homopolymers are substituted for the polymers utilized therein, bound invertase compositions are prepared, entrapped, contacted with a 15 percent aqueous sucrose solution and used in a packed column for the conversion of sucrose to invert sugar. The results are set forth in Table I, below.

TABLE I

| Ex. | Carbonyl Polymer | No. Hours Without Need for Repacking or Substantial Agitation of Packed Column |
|---|---|---|
| 12 | Acrolein-allyl glycolate (80/20) | 400 |
| 13 | Acrolein-methylvinyl ketone (45/55) (m.w. 1400) | 580 |
| 14 | Poly(isopropenylmethyl ketone) | 300 |
| 15 | Acrolein-ethyl acrylate-styrene (25/20/55) | 725 |
| 16 | Acrolein-glycidyl methacrylate (40/60) | 420 |
| 17 | Acrolein-butadiene (50/50) | 470 |
| 18 | Acrolein-vinyl acetate (60/40) | 600 |

EXAMPLE 19

10 Parts of wet (~10 percent solids) cross-linked polyacrolein-sodium bisulfite addition complex (as prepared in Example 1) are suspended in 40 parts of water at pH 3.5 and reacted with 0.110 part of crystalline trypsin, dissolved in 4 parts of water. The reaction mixture is stirred for 18 hours at 10°C. and at the end of this time the resulting covalently bound trypsin adduct is washed until free of unbound enzyme. Analysis of the washings at 280 m$\mu$ indicates that 78.2 percent of the enzyme is bound to the polymer. The wet polymer enzyme cake is entrapped as set forth in Example 6. When packed in a column utilizing either benzoyl arginine ethyl ester (BAEE) or casein substrate, the packed enzyme is shown to be effective after 20 days of continual use.

EXAMPLE 20

2.5 Parts of poly(isopropenylmethyl ketone) are stirred with 25 parts of water containing 2.1 parts of potassium metabisulfite at pH 5.8 for 16 hours at 75°C. over a nitrogen atmosphere. At the end of this time, 1.3 parts of 2-(2-aminoethyl)-5(6)-aminoethylbicyclo - 2.2.1 heptane in 5 parts of water are added to the above reaction mixture and stirred at 80°C. for 25 minutes. The hydrophilic adduct which results is washed to neutral pH and filtered. The wet cake is suspended in 30 parts of water and reacted with 0.025 part of glucose oxidase dissolved in 2 parts of water at 10°C. for 18 hours. The resultant covalently bound enzyme is washed free of unbound glucose oxidase with cold distilled water and filtered. The resultant wet filter cake is then entrapped in a reticulated synthetic rubber foam and contacted with substrate solution. The results are similar to those shown in Example 3.

EXAMPLE 21

40 Parts of distilled acrolein and 20 parts of a commercially available low molecular weight unsaturated polyester of maleic acid and dipropylene glycol containing 30 percent of vinyl toluene are combined with 0.5 part of $\alpha,\alpha'$-azobis-$\alpha,\alpha$-dimethyl-valeronitrile and allowed to polymerize at room temperature for 4 days under a nitrogen atmosphere. The resulting solid cross-linked plug is chopped up to 100 mesh pieces, washed with water and filtered. A portion (10 parts) of this polyacrolein graft is treated with 8.5 parts of sodium metabisulfite and 90 parts of water at pH 5.6 at 62°C. for 18 hours over a nitrogen atmosphere. At the end of this time the hydrophilic sodium bisulfite adduct is isolated by filtration and washed with water. The wet adduct is suspended in 50 parts of water and treated with 4 ml. of technical grade invertase (k=.6) at 15°C. for 16 hours. The reaction mixture is washed free of unbound enzyme and the resultant bound enzyme is entrapped as in Example 2. Similar results are recorded.

EXAMPLE 28

Following the techniques of the previous examples, various other enzymes are bound to polymeric materials to produce a hydrophilic composition which is then entrapped in an appropriate material. In each instance, the activity and freedom from channelling of the resultant materials is excellent. The results of these runs are set forth in Table II, below.

TABLE II

| Example | Enzyme Bound As in Example No. | Enzyme | Bound Enzyme Entrapped As in Example No. |
|---|---|---|---|
| 22 | 1 | lipase | 2 |
| 23 | 7 | L-asparaginase | 11 |
| 24 | 8 | catalase | 20 |
| 25 | 11 | tyrosinase | 6 |
| 26 | 15 | maltase | 11 |
| 27 | 1 | rennin | 2 |

EXAMPLE 28

A commercially available polymer bound enzyme comprising chymotrypsin on carboxymethyl cellulose is entrapped in a reticulated foam as set forth in Example 2. The activity of a column packed with the resultant entrapped adduct is evident 30 days after continual operation. Substantially no channelling is observed.

EXAMPLES 29–41

Other water-insoluble, hydrophilic carrier bound enzymes are entrapped as specified and utilized in the conversion of substrates to their normal conversion products. In each instance, minimum channelling results and the activity of the enzyme remains nearly normal after 20 days. The carrier bound enzymes entrapped are:

29. glucose isomerase absorbed on asbestos and entrapped as in Example 2.

30. pepsin bound to poly-p-aminostyrene and entrapped as in Example 6.

31. papain covalently coupled to the water-insoluble diazonium salt of a p-amino-DL-phenylalanine-L-leucine copolymer and entrapped as in Example 6.

32. trypsin entrapped in an acrylamide-methylenebisacrylamide gel and entrapped as in Example 11.

33. trypsin bound to bromoacetyl cellulose and entrapped as in Example 20.

34. ficin bound to carboxymethyl cellulose and entrapped as in Example 11.

35. L-asparaginase absorbed in the pores of porous glass and entrapped as in Example 11.

36. chymotrypsin bound to p-amino-DL-phenylalanine-L-leucine copolymer and entrapped as in Example 6.

37. invertase bound to methacrylic acid-methacrylic acid-3-fluoro-4,6-dinitroanilide copolymer and entrapped in a reticulated polystrene foam.

38. glucoamylase bound to carboxymethyl cellulose azide and entrapped in a reticulated polyethylene foam.

39. papain bound to collagen cross-linked with bezidine and entrapped in a reticulated vinyl resin (plasticized polyvinyl chloride) foam.

40. chymotrypsin bound to p-aminobenzyl cellulose and entrapped as in Example 2 but having a porous coating of an acrylamide-methylenebisacrylamide copolymer (95/5) on the two largest areal sides of the foam instead of the one-eighth inch sheet of polyurethane foam thereof.

41. trypsin absorbed on charcoal and entrapped as in Example 6.

We claim:

1. An article of manufacture comprising a water - insoluble, catalytically active carrier bound enzyme entrapped within no more than about 95% of the cells of a self-supporting reticulated cellular material, and said carrier bound enzyme constituting a hydrophilic, cross-linked aldehyde or ketone polymer containing sulfite groups chemically attached thereto and having a catalytically active enzyme covalently bound thereto through available aldehyde or ketone groups.

2. An article according to claim 1 wherein said carrier is a carbonyl polymer.

3. An article according to claim 1 wherein said carrier is an aldehyde polymer.

4. An article according to claim 1 wherein said carrier is an acrolein polymer.

5. An article according to claim 1 wherein said cellular material is a polyurethane resin foam.

6. An article according to claim 1 wherein said enzyme is glucose isomerase.

7. An article according to claim 1 wherein said cellular material is a polyurethane resin foam and said enzyme is invertase.

8. An article according to claim 1 wherein said enzyme is invertase and said carrier is polyacrolein.

9. An article according to claim 1 wherein said enzyme is invertase, said carrier is polyacrolein and said cellular material is a polyurethane resin foam.

10. An article according to claim 1 wherein a second reticulated cellular material is positioned about the bound enzyme containing cellular material.

* * * * *